Sept. 7, 1954      E. HUMPHREYS      2,688,398
PALLET
Filed March 11, 1950      2 Sheets-Sheet 2

INVENTOR:
ELLIS HUMPHREYS
BY Bruinings and Sutherland
ATTORNEYS.

Patented Sept. 7, 1954

2,688,398

UNITED STATES PATENT OFFICE 2,688,398

PALLET

Ellis Humphreys, St. Louis, Mo., assignor to Mississippi Glass Company, St. Louis, Mo., a corporation of New York Application March 11, 1950, Serial No. 149,075

2 Claims. (Cl. 206—62)

This invention relates generally to containers for transporting sheets of glass and the like, and particularly to containers of the pallet type adapted to be handled by the customary lift and fork trucks.

While merchandise of diverse types has been successfully handled on or in pallets for use with fork or lift trucks, no arrangement has heretofore been suggested whereby flat sheets of glass and other like ceramic material may be successfully handled; laden pallets tiered, one on top of the other; and otherwise subjected to the physical abuses which pallet type of shipping must endure.

The object of the present invention, generally stated, is to provide a pallet type shipping container suitable for use in the transportation and storage of flat glass and other like ceramic material.

Another object of the invention is to provide a pallet of the character aforesaid which will accommodate sheets and pieces of different physical dimensions, and afford protection thereto.

Other objects will become apparent from the following description when read in connection with the accompanying drawings, in which:

Figure 4 is a sectional view taken along line 4—4 of Figure 2.

Figure 1:
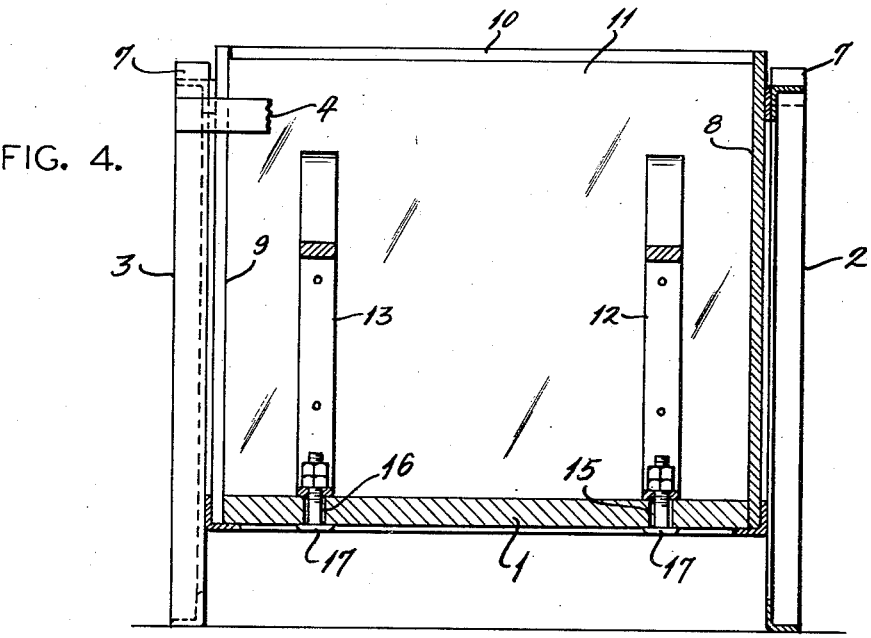
Figure 1 is a perspective view of a pallet constructed in accordance with the present invention, laden with glass sheets, part being torn away to reveal the relation of the container and contents.
Figure 2:
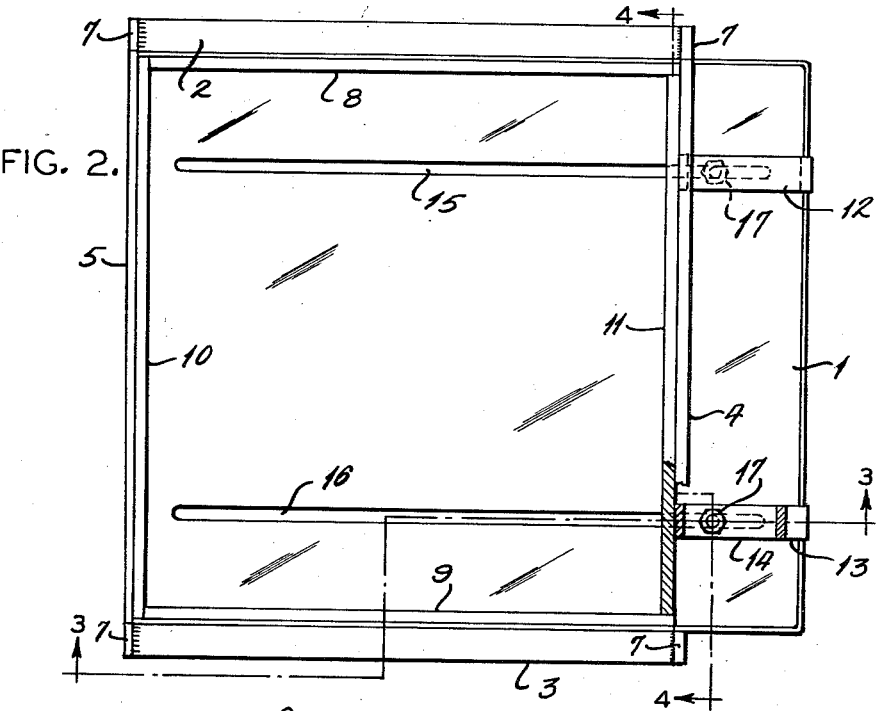
Figure 2 is a plan view of the pallet shown in Figure 1.

In accordance with the present invention, the container is constructed so as to provide a tray, supported at a sufficient elevation above the floor or other supporting surface so as to accommodate the fork or lift platform of a truck therebeneath. At opposite sides of the tray, frame members extend upwardly for a substantial distance, sufficient to protect the sheets of glass to be transported therein, and being provided at their upper extremity with parts adapted to receive and interlock with the supporting legs of a similar container, superimposed thereon. The container of the present invention is particularly characterized by the feature that one of its bounding walls is adjustable in the horizontal direction with reference to the tray, so that the container may be loaded freely, and an individual container is adapted to receive and securely protect sheets of glass of various dimensions.

Referring now to the drawings for an illustrative embodiment, the container comprises a tray 1, supported between the rectangular end frames 2 and 3. In the embodiment shown, the end frames 2 and 3 are constructed of angle sections, welded together. The end frames 2 and 3 extend for sufficient distance below the tray 1 to elevate the latter above the supporting surface, such as a floor, sufficiently to accommodate the usual industrial truck. The end frames 2 and 3 extend for a much greater distance above the tray 1, depending upon the maximum vertical dimension of the sheets of glass to be transported therein.

At their upper extremities the end frames 2 and 3 are connected by bars 4 and 5, and thereadjacent, at each corner, upstanding lugs 7 project above the upper members of the frames 2 and 3 to define therebetween a resting place for, and to interlock with, the uprights of the end frames of a similar container superimposed thereon.

The tray 1, the end frames 2 and 3, and the bars 4 and 5, define an enclosure, open at the top, within which the sheets of glass may be loaded and transported. Three sides of the enclosure, to-wit, those embraced by the end frames 2 and 3, and that across which the bar 5 extends, are provided with linings 8, 9, and 10 respectively of cushion material such as paperboard, Celotex, or the like so as to form fixed walls. The fourth side of the enclosure is provided with an adjustable wall, consisting of a sheet of similar cushion material 11 and supporting brackets 12 and 13. The brackets 12 and 13 each have a laterally extending base portion 14, adapted to rest upon the upper surface of tray 1. The tray 1 is provided with a pair of slots 15 and 16, extending perpendicularly to the wall material 11, and spaced apart a distance corresponding to the spacing between the brackets 12 and 13. The laterally extending bases 14 are connected to the tray 1 by bolts 17, which extend through the slots 15 and 16, so that the wall at 11 is given a wide range of movement between wall at 10 and bar 4, but may be clamped at any selected position between those limits.

Figure 3:
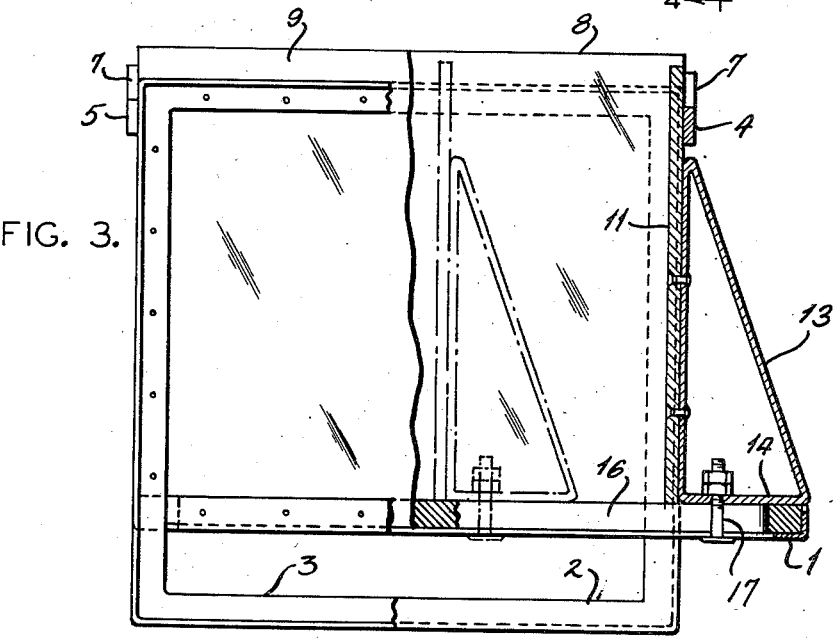
Figure 3 is a sectional view taken along line 3—3 of Figure 2.

In operation, the container is prepared to receive the sheets of glass by moving the wall 11—13 toward the position shown in full line in Figure 3, so as to provide as much space as possible, or as is needed, within the enclosure. Sheets of glass 20 are then placed in the space defined by the wall material 8, 9, and 10, so that their vertical edges engage the wall material 10. Ordinarily a given shipment will involve a sufficient quantity of one size to fill a container, so that when the container is filled (with the vertical edges of all sheets in engagement with wall material 10), the wall 11—13 is then moved into position where it engages the opposite vertical edges of the inserted sheets. The bolts 17 are then tightened to retain the sheets in position, and prevent edgewise movement thereof. Thus loaded, the container may be transported in any desired manner, affording ample protection to the sheets of glass. It will be understood that it is usually advisable to separate individual sheets of glass with layers of resilient material, in the customary manner. If the container is not completely filled by the quantity of glass to be transported thereby, any suitable filler of the same horizontal dimension may be inserted to fill the space. When the sheets of glass being handled are of a dimension such as to nicely fit between the walls at 8 and 9 with their vertical edges in contact therewith, the container may be loaded in that manner, but in view of the contact at both edges, it is easier to load the sheets of glass in the opposite direction and, as pointed out above, the container is adapted to afford protection to sheets of glass of various dimensions, when loaded in the manner first indicated above.

From the foregoing description, those skilled in the art should readily understood the construction and operation of the invention, and realize that it accomplishes its objects. While one complete embodiment has been described, it is not to be understood that the invention is limited to the details of that disclosure, save as indicated in the appended claims.

Having thus described the invention, what is claimed and desired to be secured by Letters Patent is:

1. A container for transporting sheets of glass and the like comprising a pair of open end frames, a tray extending between said end frames parallel to the bottom thereof but in spaced relation thereabove, said end frames extending for a substantial distance above the tray, a fixed wall bridging the space between said end frames at one side, a wall movable between and bridging the space between said end frames at the other side, said movable wall being movable toward and away from said fixed wall without disassembly, means for supporting said movable wall in a selected position, and the tops of said end frames having brackets at their sides for interlocking with the bottoms of similar end frames of a like container superimposed thereon, the tops of the end frames being interconnected by a fixed brace at the side remote from said fixed wall.

2. A container for transporting sheets of glass and the like, comprising a pair of open generally rectangular end frames, a tray fixed between the end frames parallel to the bottoms thereof but in spaced relation thereabove, said frames extending for a substantial distance above the tray, fixed brace members interconnecting said frames at their sides adjacent their tops, wall-forming panels supported against the inner surfaces of said frames and one of said brace members, the wall-forming panels at the end frames extending above the tops of the end frames, an upright support movable over the tray toward and away from said one brace member, the support having a supporting leg slidably seated upon the tray, the tray having a slot extending generally parallel to the end frames beneath the support, the support having an adjustable fastener carried within said slot for clamping the support to the tray at selected positions therealong, said end frames having outwardly projecting portions at their tops and bottoms cooperable for stacking several such containers.

References Cited in the file of this patent

UNITED STATES PATENTS

| Number | Name | Date |
|---|---|---|
| 271,827 | Flynn | Feb. 6, 1883 |
| 410,414 | Hall | Sept. 3, 1889 |
| 548,357 | Eddy | Oct. 22, 1895 |
| 998,964 | Gammeter | July 25, 1911 |
| 1,638,563 | Carruth et al. | Aug. 9, 1927 |
| 1,866,966 | Connor et al. | July 12, 1932 |
| 2,359,406 | Crosser | Oct. 3, 1944 |
| 2,497,453 | Hazen | Feb. 14, 1950 |